(12) United States Patent
Klemen et al.

(10) Patent No.: US 7,235,029 B2
(45) Date of Patent: Jun. 26, 2007

(54) INTEGRATED MOTOR CLUTCH FOR ELECTRICALLY VARIABLE TRANSMISSIONS

(75) Inventors: Donald Klemen, Carmel, IN (US); Michael R. Schmidt, Carmel, IN (US)

(73) Assignee: General Motors Corporation, Detroit, MI (US)

( * ) Notice: Subject to any disclaimer, the term of this patent is extended or adjusted under 35 U.S.C. 154(b) by 153 days.

(21) Appl. No.: 10/851,351

(22) Filed: May 21, 2004

(65) Prior Publication Data

US 2005/0261097 A1 Nov. 24, 2005

(51) Int. Cl.
*F16H 3/72* (2006.01)

(52) U.S. Cl. ............... 475/5; 475/151; 475/275; 475/282; 180/65.2; 180/65.6

(58) Field of Classification Search ............ 475/5, 475/149, 151, 275, 282; 477/3, 4, 5, 6; 192/87.11, 192/87.15; 180/65.2, 65.6, 65.7
See application file for complete search history.

(56) References Cited

U.S. PATENT DOCUMENTS

| | | | | |
|---|---|---|---|---|
| 4,082,171 A * | 4/1978 | Lalin et al. | ............... | 192/70.2 |
| 4,440,282 A * | 4/1984 | Ishimaru et al. | ........... | 192/70.2 |
| 4,640,294 A * | 2/1987 | Ordo | ..................... | 192/70.2 |
| 5,009,301 A | 4/1991 | Spitler | ..................... | 192/106.2 |
| 5,482,512 A * | 1/1996 | Stevenson | ..................... | 475/5 |
| 5,558,175 A * | 9/1996 | Sherman | ..................... | 180/65.2 |
| 5,558,589 A | 9/1996 | Schmidt | ..................... | 475/5 |
| 5,789,823 A * | 8/1998 | Sherman | ..................... | 290/47 |
| 5,931,757 A | 8/1999 | Schmidt | ..................... | 475/2 |
| 5,935,035 A * | 8/1999 | Schmidt | ..................... | 475/5 |
| 5,944,630 A * | 8/1999 | Omote | ..................... | 477/5 |
| 6,019,699 A * | 2/2000 | Hoshiya et al. | ............ | 477/20 |
| 6,258,001 B1 * | 7/2001 | Wakuta et al. | ................ | 475/5 |
| 6,371,877 B1 * | 4/2002 | Schroeder et al. | ............ | 475/5 |
| 6,474,428 B1 * | 11/2002 | Fujikawa et al. | .......... | 180/65.2 |
| 6,523,663 B2 * | 2/2003 | Murata | ..................... | 192/70.2 |
| 6,551,208 B1 * | 4/2003 | Holmes et al. | ................ | 475/5 |
| 6,746,354 B1 * | 6/2004 | Ziemer | ..................... | 475/5 |
| 6,863,140 B2 * | 3/2005 | Noreikat et al. | ........... | 180/65.2 |
| 2004/0055845 A1 * | 3/2004 | Friedrich et al. | .......... | 192/70.2 |
| 2004/0112654 A1 * | 6/2004 | Kozarekar et al. | ......... | 180/65.2 |
| 2005/0227801 A1 * | 10/2005 | Schmidt et al. | ............... | 475/5 |

\* cited by examiner

Primary Examiner—David D. Le
(74) Attorney, Agent, or Firm—Dan L. Thompson

(57) ABSTRACT

A two-mode, compound-split, electro-mechanical transmission utilizes an input member for receiving power from an engine, and an output member for delivering power from the transmission. First and second motor/generators are operatively connected to an energy storage device through a control for interchanging electrical power among the storage device, the first motor/generator and the second motor/generator. The transmission employs three planetary gear sets. Each planetary gear arrangement utilizes first, second and third gear members. The transmission also employs five torque-transmitting mechanisms. One of the five torque-transmitting mechanisms is contained within each of the first and second motor/generators.

16 Claims, 3 Drawing Sheets

INTEGRATED MOTOR CLUTCH FOR ELECTRICALLY VARIABLE TRANSMISSIONS

TECHNICAL FIELD

The present invention relates to a clutch integrated into a motor in an electrically variable transmission, and more particularly to a hybrid electromechanical vehicular transmission that utilizes three interactive planetary gear arrangements that are operatively connected to an engine and two motor/generators, wherein clutches are positioned inside each of the motor/generators.

BACKGROUND OF THE INVENTION

The purpose of a vehicular transmission is to provide a neutral, at least one reverse and one or more forward driving ranges that impart power from an engine, and/or other power sources, to the drive members which deliver the tractive effort from the vehicle to the terrain over which the vehicle is being driven. As such, the drive members may be front wheels, rear wheels or a track, as required to provide the desired performance.

A series propulsion system is a system in which energy follows a path from an engine to an electric storage device and then to an electrical motor which applies power to rotate the drive members. There is no direct mechanical connection between the engine and the drive members in a series propulsion system.

Transmissions adapted to receive the output power from either an engine or an electric motor, or both, have heretofore relied largely on what has been designated as series, hybrid propulsion systems. Such systems are designed with auxiliary power units (APUs) of relatively low power for minimum emissions and best fuel economy. However, such combinations of small APUs and even large energy storage devices do not accommodate high-average power vehicles or address duty cycles that demand continuous, constant speed operation. Steep grades and sustained high-average cruising speeds at desired high efficiencies are not achievable with a typical, series, hybrid transmission configuration.

The challenge, therefore, is to provide a power system that will operate at high efficiencies over a wide variety of operating conditions. Desirable electric variable transmissions should leverage the benefits of a series, hybrid transmission for desirable low-average power duty cycles—i.e., low speed start/stop duty cycles—as well as the benefits of a parallel hybrid transmission for high-average output power, high speed duty cycles. In a parallel arrangement the power supplied by the engine and the power supplied by the source of electrical energy are independently connected to the drive members.

Moreover, perfecting a concept wherein two modes, or two integrated power split gear trains, with either mode available for synchronous selection by the on-board computer to transmit power from the engine and/or the motor/generator to the output shaft results in a hybrid transmission having an extremely wide range of applications.

The desired beneficial results may be accomplished by the use of a variable, two-mode, input and compound split, parallel hybrid electro-mechanical transmission. Such a transmission utilizes an input member to receive power from the vehicle engine and a power output member to deliver power to drive the vehicle. First and second motor/generator power controllers are connected to an energy storage device, such as a batter pack, so that the energy storage devices can accept power from, and supply power to, the first and second motor/generators. A control unit regulates power flow among the energy storage devices and the motor/generators as well as between the first and second motor/generators.

A variable, two-mode, input-split, parallel, hybrid electromechanical transmission also employs at least one planetary gear set. The planetary gear set has an inner gear member and an outer gear member, each of which meshingly engages a plurality of planet gear members. The input member is operatively connected to one of the gear members in the planetary gear set, and means are provided operatively to connect the power output member to another of the gear members in the planetary gear set. One of the motor/generators is connected to the remaining gear member in the planetary gear set, and means are provided operatively to connect the other motor/generator to the output shaft.

Operation in the first or second mode may be selectively achieved by using torque transfer devices. Heretofore, in one mode the output speed of the transmission is generally proportional to the speed of one motor/generator, and in the second mode the output speed of the transmission is generally proportional to the speed of the other motor/generator.

In some embodiments of the variable, two-mode, input-split, parallel, hybrid electromechanical transmission, a second planetary gear set is employed. In addition, some embodiments may utilize three torque transfer devices—two to select the operational mode desired of the transmission and the third selectively to disconnect the transmission from the engine. In other embodiments, all three torque transfers may be utilized to select the desired operational mode of the transmission.

With reference, again, to a simple planetary gear set, the planet gear members are normally supported for rotation on a carrier that is itself rotatable. When the sun gear is held stationary and power is applied to the ring gear, the planet gear members rotate in response to the power applied to the ring gear and thus "walk" circumferentially about the fixed sun gear to effect rotation of the carrier in the same direction as the direction in which the ring gear is being rotated.

When any two members of a simple planetary gear set rotate in the same direction and at the same speed, the third member is forced to turn at the same speed, and in the same direction. For example, when the sun gear and the ring gear rotate in the same direction, and at the same speed, the planet gears do not rotate about their own axes but rather act as wedges to lock the entire unit together to effect what is known as direct drive. That is, the carrier rotates with the sun and ring gears.

However, when the two gear members rotate in the same direction, but at different speeds, the direction in which the third gear member rotates may often be determined simply by visual analysis, but in many situations the direction will not be obvious and can only be determined by knowing the number of teeth present in the gear members of the planetary gear set.

Whenever the carrier is restrained from spinning freely, and power is applied to either the sun gear or the ring gear, the planet gear members act as idlers. In that way, the driven member is rotated in the opposite direction as the drive member. Thus, in many transmission arrangements when the reverse drive range is selected, a torque transfer device serving as a brake is actuated frictionally to engage the carrier and thereby restrain it against rotation so that power applied to the sun gear will turn the ring gear in the opposite direction. Thus, if the ring gear is operatively connected to the drive wheels of a vehicle, such an arrangement is capable of reversing the rotational direction of the drive wheels, and thereby reversing the direction of the vehicle itself.

As those skilled in the art will appreciate, a transmission system using a power split arrangement will receive power from two sources. Utilization of one or more planetary gear sets permits two or more gear trains, or modes, by which to deliver power from the input member of the transmission to the output member thereof.

U.S. Pat. No. 5,558,589 which issued on Sep. 24, 1996 to General Motors Corporation, as is hereby incorporated by reference, teaches a variable, two-mode, input-split, parallel, hybrid electromechanical transmission wherein a "mechanical point" exists in the first mode and two mechanical points exist in the second mode. U.S. Pat. No. 5,931,757 which issued on Aug. 3, 1999 to General Motors Corporation, and is hereby incorporated by reference, teaches a two-mode, compound-split, electromechanical transmission with one mechanical point in the first mode and two mechanical points in the second mode.

A mechanical point occurs when either of the motor/generators is stationary at any time during operation of the transmission in either the first or second mode. The lack of a mechanical point is a drawback inasmuch as the maximum mechanical efficiency in the transfer of power from the engine to the output occurs when one of the motor/generators is at a mechanical point, i.e., stationary. In variable, two-mode, input-split, parallel, hybrid electromechanical transmissions, however, there is typically one point in the second mode at which one of the motor/generators is not rotating such that all the engine power is transferred mechanically to the output.

If further clutches are added, more mechanical points may be achieved. However, the addition of clutches creates packaging challenges and the additional components add cost, which increases the difficulty of developing a commercially-feasible mass-produced electrically variable transmission.

SUMMARY OF THE INVENTION

The invention provides an electrically variable transmission including clutches integrated into the motor/generators to improve packaging efficiency and provide a low cost, compact module.

More specifically, the invention provides an electromechanical transmission including a plurality of planetary gear sets each having first, second and third gear members. A motor/generator is continuously connected with one of the gear members. A clutch is operative to selectively connect the motor/generator with another one of the gear members. The clutch is integrated into the motor/generator. Preferably, the clutch is located radially inside the motor/generator, and the motor/generator and clutch are both mounted to a common support structure.

The clutch includes a piston, a return spring, a balance dam chamber, and a clutch pack, all positioned inside the motor/generator.

The motor/generator includes a rotor hub having internal contours, and the clutch includes reaction plates formed to engage the internal contours to prevent rotation of the reaction plates. An output hub is positioned radially inside the rotor hub, and friction plates are connected to the output hub and interposed between the reaction plates.

Another aspect of the invention provides a two-mode compound split hybrid electromechanical transmission, including first and second motor/generators, and three planetary gear arrangements. Each planetary gear arrangement includes first, second and third gear members. The first and second motor/generators are coaxially aligned with each other and with the three planetary gear arrangements. At least one of the gear members in the first or second planetary gear arrangement is connected to the first motor/generator, and at least one of the gear members in the third planetary gear arrangement is connected to the second motor/generator.

In this embodiment, a first torque-transmitting mechanism selectively connects one of the gear members associated with each of the first, second and third planetary gear arrangements to each other and to the output member. A second torque-transmitting mechanism selectively connects one of the gear members of the third planetary gear set with ground. A third torque-transmitting mechanism selectively connects one of the gear members of the second planetary gear set with ground. A fourth torque-transmitting mechanism selectively connects the first motor/generator with one of the gear members. The fourth torque-transmitting mechanism is positioned radially inside the first motor/generator. A fifth torque-transmitting mechanism selectively connects the second motor/generator with one of the gear members. The fifth torque-transmitting mechanism is positioned radially inside the second motor/generator.

A first interconnecting member continuously connects one of the members of the first planetary gear set with one of the members of the second planetary gear set. A second interconnecting member continuously connects another one of the members of the first planetary gear set with another one of the members of the second planetary gear set.

The above features and advantages, and other features and advantages, of the present invention are readily apparent from the following detailed description of the best modes for carrying out the invention when taken in connection with the accompanying drawings.

DESCRIPTION OF THE PREFERRED EMBODIMENTS

Figure 1:
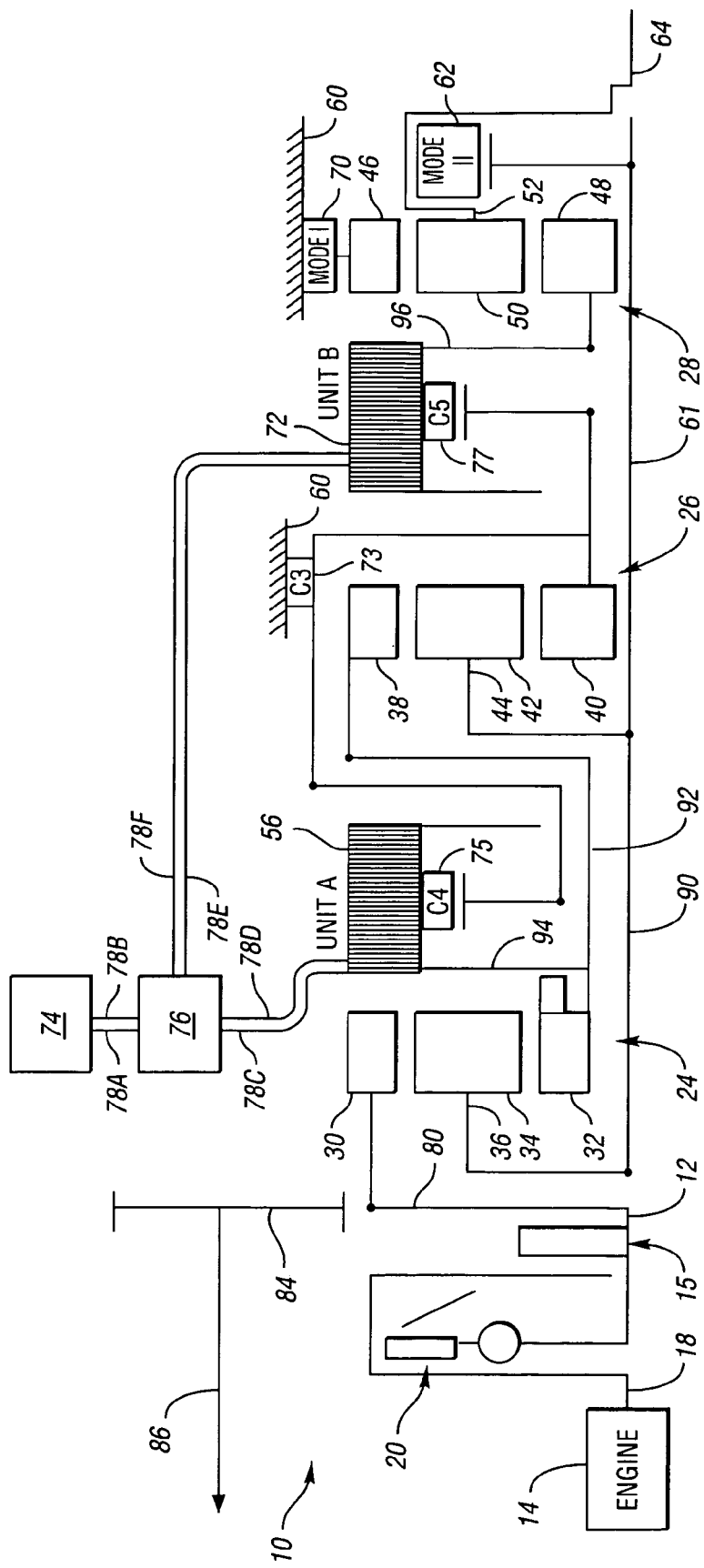
FIG. 1 is a schematic representation of a two-mode, electro-mechanical transmission embodying the concepts of the present invention.

One representative form of a two-mode, compound-split, electromechanical transmission embodying the concepts of the present invention is depicted in FIG. 1, and is designated generally by the numeral 10. The hybrid transmission 10 has an input member 12 that may be in the nature of a shaft which may be directly driven by an engine 14. A transient torque damper may be incorporated between the output shaft 18 of the engine 14 and the input member 12 of the hybrid transmission 10. An example of a transient torque damper of the type recommended for the present usage is disclosed in detail in U.S. Pat. No. 5,009,301 which issued on Apr. 23, 1991 to General Motors Corporation, which is hereby incorporated by reference in its entirety. The transient torque damper may incorporate, or be employed in conjunction with, a torque transfer device 20 to permit selective engagement of the engine 14 with the hybrid transmission 10, but it must be understood that the torque transfer device 20 is not utilized to change, or control, the mode in which the hybrid transmission 10 operates.

In the embodiment depicted the engine 14 may be a fossil fuel engine, such as a diesel engine which is readily adapted to provide its available power output delivered at a constant number of revolutions per minute (RPM). In the exemplary embodiment, the engine 14 can—after start-up, and during the majority of its input—operate at a constant speed of approximately 6000 RPM. Although it must be understood that the speed and horsepower output of the engine 14 is not critical to the invention, for the purpose of effecting an absolutely clear understanding of the hybrid transmission 10, an available output of about 305 horsepower from engine 14 will be assumed for the description of an exemplary installation. An input pump 15 is also provided. Irrespective of the means by which the engine 14 is connected to the input member 12 of the transmission 10, the input member 12 is connected to a planetary gear set 24 in the transmission 10.

The hybrid transmission 10 utilizes three planetary gear sets 24, 26 and 28. The first planetary gear set 24 has an outer gear member 30 that may generally be designated as the ring gear, which circumscribes an inner gear member 32, generally designated as the sun gear. A plurality of planet gear members 34 are rotatably mounted on a carrier 36 such that each planet gear member 34 meshingly engages both the outer gear member 30 and the inner gear member 32.

The second planetary gear set 26 also has an outer gear member 38, generally designated as the ring gear, which circumscribes an inner gear member 40, generally designated as the sun gear. A plurality of planet gear members 42 are rotatably mounted on a carrier 44 such that each planet gear 42 meshingly engages both the outer gear member 38 and the inner gear member 40.

The third planetary gear set 28 also has an outer gear member 46, generally designated as the ring gear, which circumscribes an inner gear member 48, generally designated as the sun gear. A plurality of planet gear members 50 are rotatably mounted on a carrier 52 such that each planet gear 50 meshingly engages both the outer gear member 46 and the inner gear member 48.

In this embodiment, the ring gear/sun gear tooth ratio of the planetary gear set 24 is 66/34, the ring gear/sun gear tooth ratio of the planetary gear set 26 is 66/34, and the ring gear/sun gear tooth ratio of the planetary gear set 28 is 86/34.

The carrier 52 of the third planetary gear set 28 is connected directly to the transmission output member 64. When the hybrid transmission 10 is used in a land vehicle, the output member 64 may be connected to the vehicular axles (not shown) that may, in turn, terminate in the drive members (also not shown). The drive members may be either front or rear wheels of the vehicle on which they are employed, or they may be the drive gear of a track vehicle.

The carrier 36 is continuously connected with the carrier 44 through the interconnecting member 90. The sun gear 32 is continuously connected with the ring gear 38 through the interconnecting member 92. The rotor of the first motor/generator 56 is continuously connected with the sun gear 32 through the interconnecting member 94. The rotor of the second motor/generator 72 is continuously connected with the sun gear 48 through the interconnecting member 96.

The first torque-transmitting mechanism (clutch) 62 selectively connects the carriers 36, 44 with the carrier 52, and with the output member 64. The first torque-transmitting mechanism 62 is engaged during the second mode of operation of the transmission. The second torque-transmitting mechanism (brake) 70 selectively connects the ring gear 46 with the transmission housing 60. The second torque-transmitting mechanism 70 is engaged in the first mode of operation of the transmission 10.

A third torque-transmitting mechanism (brake) 73 selectively connects the sun gear 40 with the transmission housing 60. The fourth torque-transmitting mechanism (clutch) 75 selectively connects the rotor of the first motor/generator 56 with the sun gear 40. The fifth torque-transmitting mechanism (clutch) 77 selectively connects the rotor of the second motor/generator 72 with the sun gear 40.

It should be noted that both motor/generators 56 and 72 are of an annular configuration which permits them to circumscribe the three planetary gear sets 24, 26 and 28 such that the planetary gear sets 24, 26 and 28 are disposed radially inwardly of the motor/generators 56 and 72. This configuration assures that the overall envelope, i.e., the circumferential dimension, of the transmission 10 is minimized.

As was previously herein explained in conjunction with the description of the engine 14, it must similarly be understood that the rotational speed and horsepower output of the first and second motor/generators 56 and 72 are also not critical to the invention, but for the purpose of effecting an absolutely clear understanding of the hybrid transmission 10, the motors/generators 56 and 72 have a continuous rating of 30 horsepower and a maximum speed of about 10200 RPM. The continuous power rating is approximately $\frac{1}{10}$ that of the engine 14, and the maximum speed is approximately 1.5× that of the engine 14, although these depend on the type of engine, final gear schematic and duty cycle.

As should be apparent from the foregoing description, and with particular reference to FIG. 1, the transmission 10 selectively receives power from the engine 14. As will now be explained, the hybrid transmission also receives power from an electric storage device 74. The electric storage device 74 may be one or more batteries. Other electric storage devices that have the ability to store electric power and dispense electric power may be used in place of the batteries without altering the concepts of the present invention. As was explained in conjunction with the description of the engine 14 and the motor/generators 56 and 72, it must similarly be understood that the horsepower output of the electrical storage device 74 is also not critical to the invention, but for the purpose of effecting an absolutely clear understanding of the hybrid transmission 10 an output of about 75 horsepower from the electrical storage device 74 will be assumed for description of an exemplary device. The battery pack is sized depending on regenerative requirements, regional issues such as grade and temperature, and propulsion requirements such as emissions, power assist and electric range.

The electric storage device 74 communicates with an electrical control unit (ECU) 76 by transfer conductors 78A and 78B. The ECU 76 communicates with the first motor/generator 56 by transfer conductors 78C and 78D, and the ECU 76 similarly communicates with the second motor/generator 72 by transfer conductors 78E and 78F.

As is apparent from the previous paragraph, a particular structural member, component or arrangement may be employed at more than one location. When referring generally to that type of structural member, component or arrangement, a common numerical designation will be employed. However, when one of the structural members, components or arrangements so identified is to be individually identified, it will be referenced by virtue of a letter suffix employed in combination with the numerical designation employed for general identification of that structural member, component or arrangement. Thus, there are at least six transfer conductors which are generally identified by the numeral 78, but the specific, individual transfer conductors are, therefore, identified as 78A, 78B, 78C, 78D, 78E and 78F in the specification and on the drawings. This same suffix convention shall be employed throughout the specification.

A drive gear 80 may be presented from the input member 12. As depicted, the drive gear 80 fixedly connects the input member 12 to the outer gear member 30 of the first planetary gear set 24, and the drive gear 80, therefore, receives power from the engine 14 and/or the motor/generators 56 and/or 72. The drive gear 80 meshingly engages a transfer gear 84 that is secured to one end of a shaft 86. The other end of the shaft 86 may be secured to a transmission fluid pump and/or auxiliary power take off unit.

The operator of the vehicle has three well-known, primary devices to control the transmission 10. One of the primary control devices is a well-known drive range selector (not shown) that directs the ECU 76 to configure the transmission for either the park, reverse, neutral, or forward drive range. The second and third primary control devices constitute an accelerator pedal (not shown) and a brake pedal (also not shown). The information obtained by the ECU 76 from these three primary control sources will hereinafter be referred to as the "operator demand." The ECU 76 also obtains information from both the first and second motor/generators 56 and 72, respectively, the engine 14 and the electric storage device 74. In response to an operator's action, the ECU 76 determines what is required and then manipulates the selectively operated components of the hybrid transmission 10 appropriately to respond to the operator demand.

For example, in the exemplary embodiment shown in FIG. 1, when the operator has selected a forward drive range and manipulates either the accelerator pedal or the brake pedal, the ECU 76 determines if the vehicle should accelerate or decelerate. The ECU 76 also monitors the state of the power sources, and determines the output of the transmission required to effect the desired rate of acceleration or deceleration. Under the direction of the ECU 76, the transmission is capable of providing a range of output speeds from slow to fast in order to meet the operator demand.

To reiterate, the transmission 10 is a two-mode, compound-split, electromechanical, vehicular transmission. In other words, the output member 64 receives power through two distinct gear trains within the transmission 10. A first mode, or gear train, is selected when the torque transfer device 70 is actuated in order to "ground" the outer gear member 46 of the third planetary gear set 28. A second mode, or gear train, is selected when the torque transfer device 70 is released and the torque transfer device 62 is simultaneously actuated to connect the shaft 61 to the carrier 52 of the third planetary gear set 28.

Those skilled in the art will appreciate that the ECU 76 serves to provide a range of output speeds from relatively slow to relatively fast within each mode of operation. This combination of two modes with a slow to fast output speed range in each mode allows the transmission 10 to propel a vehicle from a stationary condition to highway speeds while satisfying the other objects of the invention. Additionally, the ECU 76 coordinates operation of the transmission 10 so as to allow synchronized shifts between the modes.

A complete operating description of a transmission similar to that identified by the schematic of FIG. 1 may be found in separately filed U.S. patent application Ser. No. 10/946,760, filed on Sep. 22, 2004, commonly assigned to General Motors Corporation, and hereby incorporated by reference in its entirety.

The invention is particularly characterized by the positioning of the fourth and fifth torque-transmitting mechanisms 75, 77 radially inside the first and second motor/generators 56, 72, respectively, to provide a compact transmission design.

Figure 2:
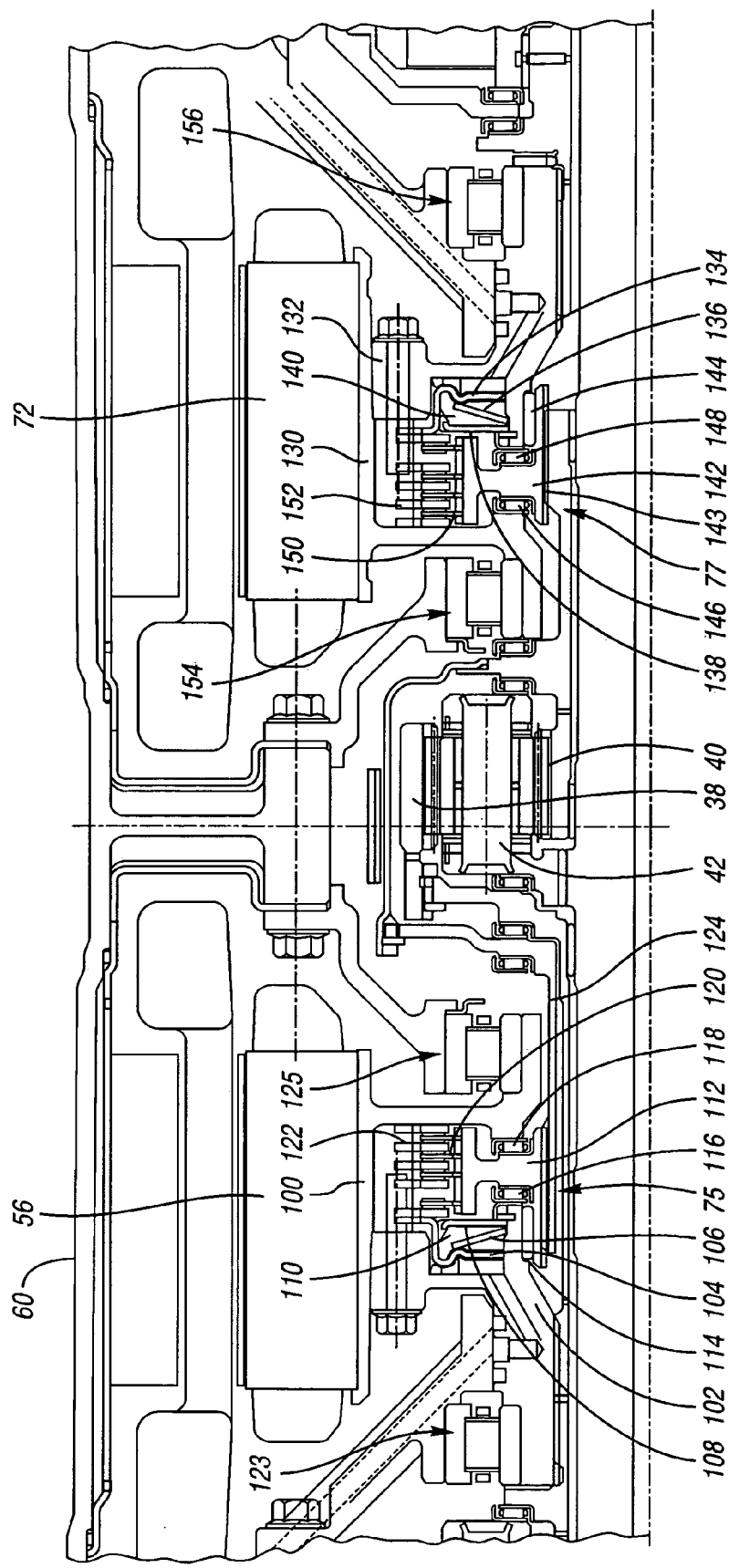
FIG. 2 is a partial longitudinal cross-sectional view of a transmission corresponding with FIG. 1.

Turning to FIG. 2, a partial longitudinal cross-sectional view is shown of a transmission corresponding with the schematic of FIG. 1. Like numerals are used in FIG. 2 to refer to like components from FIG. 1. Referring specifically to FIG. 2, the clutch 75 includes an outer hub 100 which is integral with the motor/generator 56. The piston and bearing carrier 102 has an interference fit with the outer hub 100, and carries the piston 104, return spring 106, and separator 108 which cooperates with the piston 104 to form the balance dam chamber 110.

An inner hub 112 is supported by the bushing 114 and bearings 116, 118. Friction plates 120 are splined to the inner hub 112, and interposed between the reaction plates 122, which are splined to the outer hub 100, as described below. The outer hub 100 and piston and bearing carrier 102 are supported on the bearing assemblies 123, 125.

The first motor/generator 56 is continuously connected with the ring gear 38 through the piston and bearing carrier 102. The first motor/generator 56 is selectively connectable with the sun gear 32 via the clutch 75 and flanged shaft 124.

The clutch 77 is configured similarly as a clutch 75. The clutch 77 includes an outer hub 130 having an interference fit with a piston and bearing carrier 132. The piston and bearing carrier 132 supports the piston 134, the return spring 136 and separator 138, which cooperates with the piston 134 to form the balance dam chamber 140. An inner hub 142 is "floatable" along a spline engagement 143, and supported by the bushing 144 and bearings 146, 148. The inner hub 142 is externally splined to friction plates 150 which are interposed between reaction plates 152, which are splined to the outer hub 130.

The outer hub 130 and piston and bearing carrier 132 are supported between the bearing assemblies 154, 156.

The second motor/generator 72 is continuously connected with the sun gear 48 (illustrated in FIG. 1) via the piston and bearing carrier 132, and selectively connectable with the sun gear 40 through the clutch 77.

Figure 3:
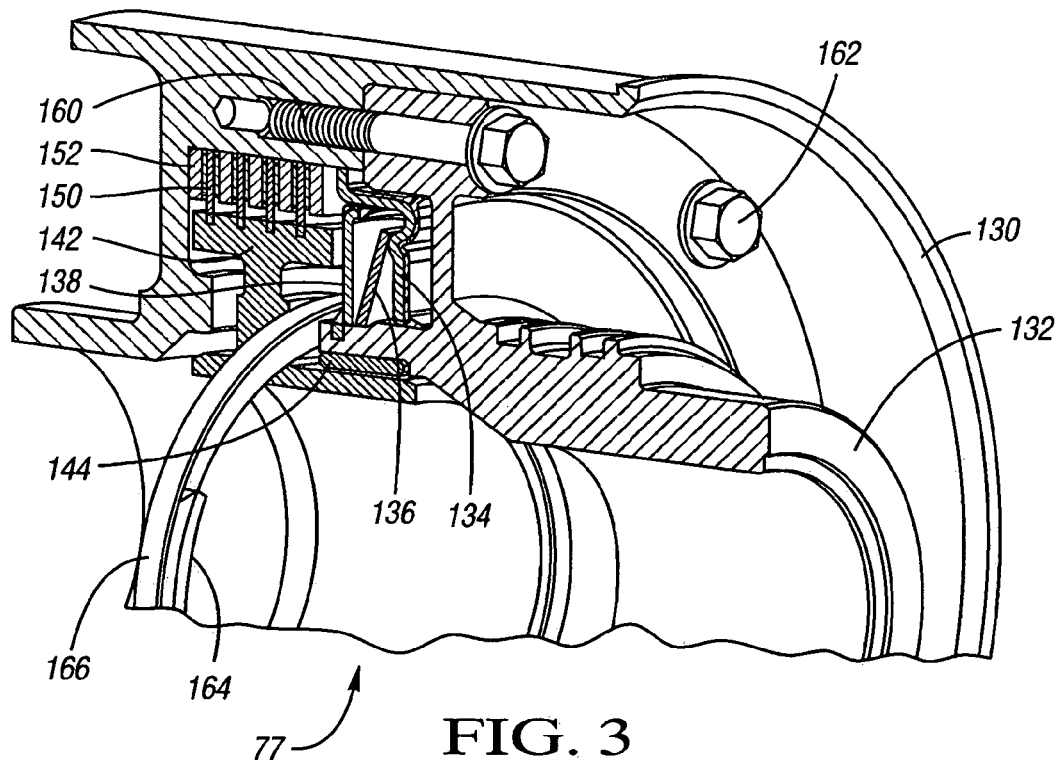
FIG. 3 is partial cut-away perspective view of a clutch integrated into a motor, corresponding with FIG. 2.
Figure 4:
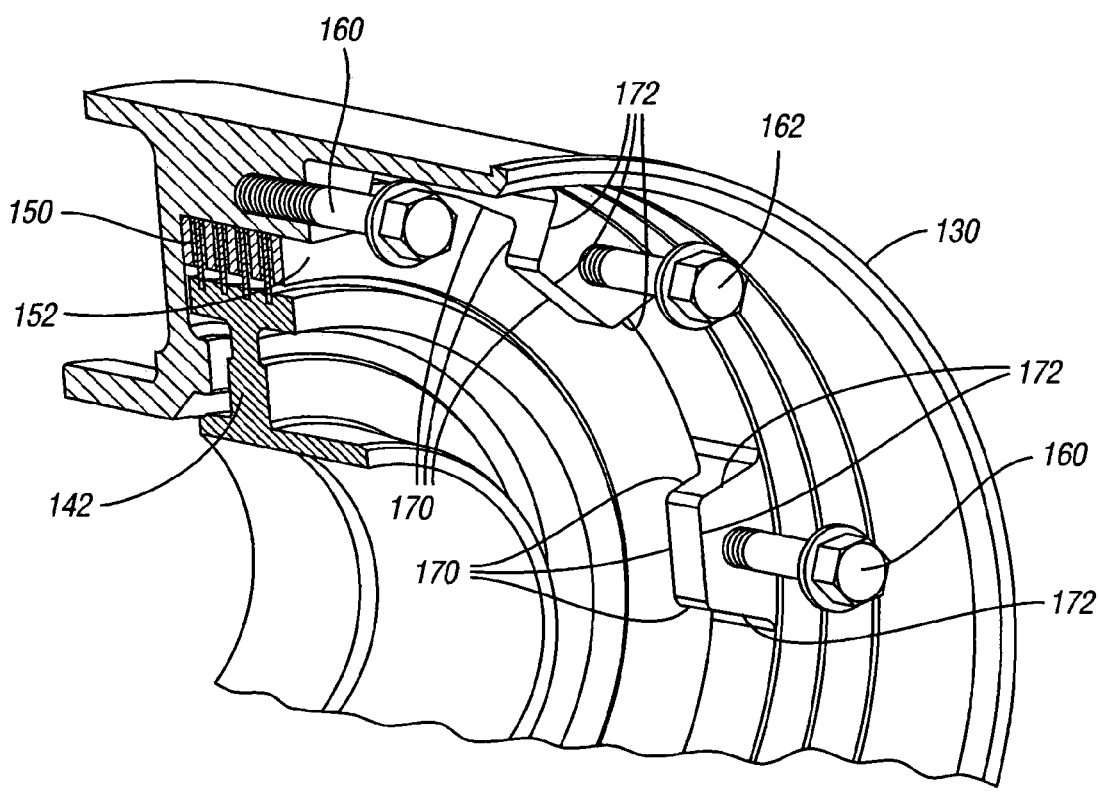
FIG. 4 is a reverse partial cut-away perspective view of the assembly of FIG. 3.

Turning to FIGS. 3 and 4, the clutch 77 is shown in greater detail. The bolts 160, 162 connect the piston and bearing carrier 132 to the outer hub 130. Also, the snap ring 164 which retains the separator 138 is held within a retention ring 166. FIG. 3 also illustrates the inner hub 142 and the friction plates 150 engaged with the reaction plates 152. The bushing 144 is also shown.

FIG. 4 illustrates that the reaction plates 152 include contours 170 to match the contours 172 of the outer hub 130 such that the reaction plates 152 are splined to the outer hub 130 to prevent rotation thereof.

The clutch 75 is configured nearly identically to the clutch 77, so FIGS. 3 and 4 are also representative of the clutch 75.

While only a preferred embodiment of the present invention is disclosed, it is to be understood that the concepts of the present invention are susceptible to numerous changes apparent to one skilled in the art. Therefore, the scope of the present invention is not to be limited to the details shown and described but is intended to include all variations and modifications which come within the scope of the appended claims.

The invention claimed is:

1. A two-mode compound split hybrid electro-mechanical transmission, comprising:
    first and second motor/generators;
    three planetary gear arrangements, each planetary gear arrangement utilizing first, second and third gear members;
    said first and second motor/generators being coaxially aligned with each other and with said three planetary gear arrangements;
    at least one of said gear members in said first or second planetary gear arrangement connected to said first motor/generator;
    at least one of said gear members in said third planetary gear arrangement being connected to said second motor/generator;
    a first torque-transmitting mechanism selectively connecting one of said gear members associated with each of said first, second and third planetary gear arrangements to each other and to an output member;
    a second torque-transmitting mechanism selectively connecting one of said gear members of said third planetary gear set with ground;
    a third torque-transmitting mechanism selectively connecting one of said gear members of said second planetary gear set with ground;
    a fourth torque-transmitting mechanism selectively connecting said first motor generator with one of said gear members, said fourth torque-transmitting mechanism being positioned radially inside said first motor/generator;
    a fifth torque-transmitting mechanism selectively connecting said second motor generator with one of said gear members, said fifth torque-transmitting mechanism being positioned radially inside said second motor/generator;
    a first interconnecting member continuously connecting one of said members of said first planetary gear set with one of said members of said second planetary gear set; and
    a second interconnecting member continuously connecting another one of said members of said first planetary gear set with another one of said members of said second planetary gear set.

2. An electro-mechanical transmission, as set forth in claim 1, wherein said fourth and fifth torque-transmitting mechanisms each includes a piston, a return spring, a balance dam chamber, and a clutch pack, all positioned inside the respective motor/generator.

3. An electro-mechanical transmission, as set forth in claim 1, wherein said first and second motor/generators each include a rotor hub with internal contours, and each respective torque-transmitting mechanism includes reaction plates formed to engage said internal contours to prevent rotation of said reaction plates.

4. An electro-mechanical transmission, as set forth in claim 3, further comprising an output hub positioned radially inside each respective rotor hub, and friction plates connected to each respective output hub and interposed between said respective reaction plates.

5. An electro-mechanical transmission, as set forth in claim 1, wherein said first, second and third gear members of each planetary gear set comprise a ring gear, carrier and sun gear, respectively, and said first interconnecting member continuously interconnects said carrier of said first planetary gear set with said carrier of said second planetary gear set.

6. An electro-mechanical transmission, as set forth in claim 5, wherein said second interconnecting member continuously interconnects said sun gear of said first planetary gear set with said ring gear of said second planetary gear set.

7. An electro-mechanical transmission, as set forth in claim 5, wherein said first torque-transmitting mechanism selectively connects said carriers of said first and second planetary gear set with said carrier of said third planetary gear set and said output member.

8. An electro-mechanical transmission, as set forth in claim 5, wherein said second torque-transmitting mechanism selectively connects said ring gear of said third torque-transmitting mechanism with ground.

9. An electro-mechanical transmission, as set forth in claim 5, wherein said third torque-transmitting mechanism selectively connects said sun gear of said second planetary gear set with ground.

10. An electro-mechanical transmission, as set forth in claim 5, wherein said fourth torque-transmitting mechanism selectively connects said first motor/generator with said sun gear of said second planetary gear set.

11. An electro-mechanical transmission, as set forth in claim 5, wherein said fifth torque-transmitting mechanism selectively connects said second motor/generator with said sun gear of said second planetary gear set.

12. An electro-mechanical transmission, as set forth in claim 5, wherein said sun gear of said first planetary gear set is connected with said first motor/generator, and said sun gear of said third planetary gear set is connected with said second motor/generator.

13. An electro-mechanical transmission, as set forth in claim 5, wherein said ring gear of said first planetary gear set is connected with an input member.

14. An eleotro-mechanical transmission, as set forth in claim 5, wherein said carrier of said third planetary gear set is continuously connected with said output member.

15. A two-mode compound split hybrid electro-mechanical transmission, comprising:
    an input member for receiving power from a prime mover power source;
    an output member for delivering power from the transmission;
    first and second motor/generators;
    an energy storage device for interchanging electrical power with said first and second motor/generators;
    a control unit for regulating the electrical power interchange between said energy storage device and said first and second motor/generators and also for regulating electrical power interchange between said first and second motor/generators;
    three planetary gear arrangements, each planetary gear arrangement utilizing first, second and third gear members;
    said first and second motor/generators being coaxially aligned with each other and with said three planetary gear arrangements;
    at least one of said gear members in said first or second planetary gear arrangement being connected to said first motor/generator;
    at least one of said gear members in said third planetary gear arrangement being connected to said second motor/generator;
    a first torque-transmitting mechanism selectively connecting one of said gear members associated with each of said first, second and third planetary gear arrangements to each other and to said output member;

a second torque-transmitting mechanism selectively connecting one of said gear members of said third planetary gear set with ground;

a third torque-transmitting mechanism selectively connecting one of said gear members of said second planetary gear set with ground;

a fourth torque-transmitting mechanism selectively connecting said first motor/generator with one of said members of said second planetary gear set, said fourth torque-transmitting mechanism being positioned radially inside said first motor/generator;

a fifth torque-transmitting mechanism selectively connecting said second motor/generator with said one of said members of said second planetary gear set connected by said fourth torque-transmitting mechanism, said fifth torque-transmitting mechanism being positioned radially inside said second motor/generator;

a first interconnecting member continuously connecting one of said members of said first planetary gear set with one of said members of said second planetary gear set; and a second interconnecting member continuously connecting another one of said members of said first planetary gear set with another one of said members of said second planetary gear set.

16. A two-mode compound split hybrid electro-mechanical transmission, comprising:

an input member for receiving power from a prime mover power source;

an output member for deliveling power from the transmission;

first and second motor/generators;

three planetary gear arrangements, each planetary gear arrangement utilizing first, second and third gear members;

at least one of said gear members in said first or second planetary gear arrangement connected to said first motor/generator;

at least one of said gear members in said third planetary gear arrangement being connected to said second motor/generator;

a first interconnecting member continuously connecting one of said members of said first planetary gear set with one of said members of said second planetary gear set;

a second interconnecting member continuously connecting another one of said members of said first planetary gear set with another one of said members of said second planetary gear set; and five torque-transmitting mechanisms for selectively interconnecting said members of said planetary gear sets with a stationary member or with other members of said planetary gear sets, wherein one of said five torque-transmitting mechanisms is positioned radially inside said first motor/generator, and another one of said five torque-transmitting mechanisms is positioned radially inside said second motor/generator.

* * * * *